Figure 1:
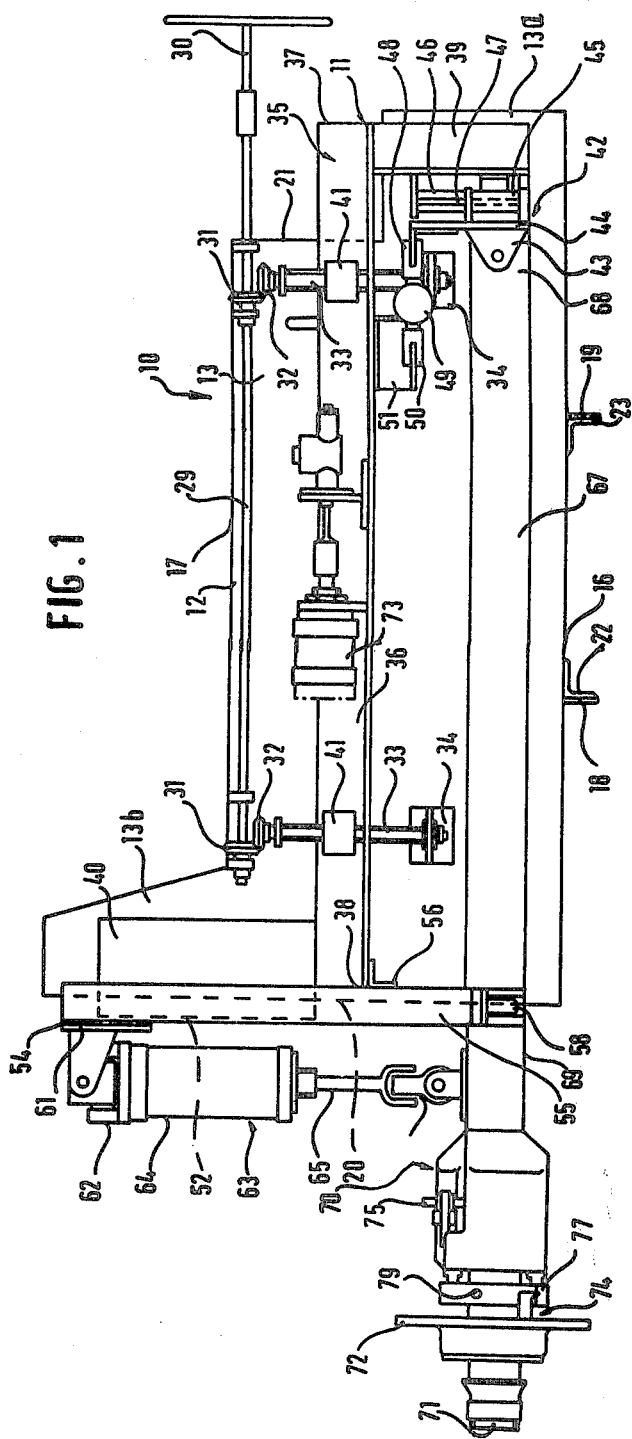

United States Patent [19]

Pennells

[11] 3,999,429
[45] Dec. 28, 1976

[54] TIRE TESTING APPARATUS
[75] Inventor: James Henry Pennells, Birmingham, England
[73] Assignee: Dunlop Limited, London, England
[22] Filed: Nov. 12, 1975
[21] Appl. No.: 630,973
[30] Foreign Application Priority Data
  Nov. 15, 1974 United Kingdom ............ 49428/74
[52] U.S. Cl. ................................................ 73/146
[51] Int. Cl.² ....................................... G01M 17/02
[58] Field of Search ........................ 73/146, 8, 129

[56] References Cited
UNITED STATES PATENTS

| 3,661,014 | 5/1972 | Ciampolini | 73/146 |
|---|---|---|---|
| 3,937,076 | 2/1976 | Pommellet | 73/146 |

Primary Examiner—S. Clement Swisher
Assistant Examiner—Denis E. Corr
Attorney, Agent, or Firm—Stevens, Davis, Miller & Mosher

[57] ABSTRACT

A tire testing apparatus comprises a framework for attachment to a vehicle, a measuring beam for mounting substantially parallel to the transverse axis of a vehicle to which the apparatus is to be attached during use, said beam being mounted pivotally at one end to the framework so that the beam is capable of pivotal movement in horizontal and vertical planes, means for mounting a tire to be tested on the end of said beam remote from the pivotal mounting, means for applying a load to the beam to place under load, a tire being tested, and at least one force transducer for measuring the force applied to the beam by a tire when under test.

12 Claims, 3 Drawing Figures

FIG. 3

TIRE TESTING APPARATUS

This invention relates to tire testing apparatus.

Previously testing to determine, for example, cornering force and braking force characteristics of tires has been carried out on cylindrical testing drums. This has the disadvantage that the tire is in contact with a curved surface during testing. While such methods provide valuable data, the data so obtained is not an accurate measurement of the forces produced by the tire on a flat road surface.

In order more accurately to determine such forces tests have been performed using a vehicle mounted on a complete set of the tires to be tested but in addition to requiring the provision of a set of at least four tires for test, this method has the disadvantage that measurements made may be slightly affected by vehicle weight transfer characteristics.

According to the present invention, a tire testing apparatus comprises a framework for attachment to a vehicle, a measuring beam for mounting substantially parallel to the transverse axis of a vehicle to which the apparatus is to be attached during use, said beam being mounted pivotally at one end to the framework so that the beam is capable of pivotal movement in horizontal and vertical planes, means for mounting a tire to be tested on the end of said beam remote from the pivotal mounting, means for applying a load to the beam to place under load a tire being tested, and at least one force transducer for measuring the force applied to the beam by a tire when under test.

The framework is provided with struts or the like by which it can be attached to, for example, the bumper position of a vehicle. Additionally bracing struts for attachment to the vehicle chassis may also be provided. The portion of the framework to which the measuring beam is pivotally mounted preferably comprises a support member adjustable in position relative to the remainder of the framework. The support member and framework may be connected by means such as, for example, screw-threaded members whereby said beam can be located horizontally when a tire mounted thereon is contacting the road surface.

The means for applying a load to the measuring beam may comprise a pneumatically or hydraulically operated piston and cylinder assembly which may be pivotally connected both to the framework and the beam.

Preferably, the apparatus also comprises means for applying braking forces to the tire. This means may comprise a pneumatically or hydraulically operated disc brake associated with the tire mounting means.

Preferably the means for mounting the tire comprises a rotatably mounted spindle on which a wheel unit can be located. The axis of the spindle is preferably adjustable in both vertical and transverse planes so that the camber and slip angles of the tire are variable. The camber and slip angles may be read off scales, located on the framework, by means of pointers located on a spindle support bearing or vice versa. The axis of the spindle may be adjustable by means of screw-threaded members acting on the housing of a bearing supporting the spindle.

Preferably two force transducers are associated with the measuring beam. One of the transducers is located between the beam adjacent the pivotal mounting and the framework and is subjected to both compression and tension forces the resultant of which is a measure of the cornering force of the tire. The other transducer is located to lie between the beam and the framework so that it is subjected to tension forces when braking forces are applied to a tire under test.

The invention also provides a vehicle to which a test apparatus as herein described is attached. Preferably the apparatus is so positioned on the vehicle that when the vehicle moves in its normal direction of forward movement the tire under test contacts the road surface at a position forward of the vehicle wheels.

Figure 2:
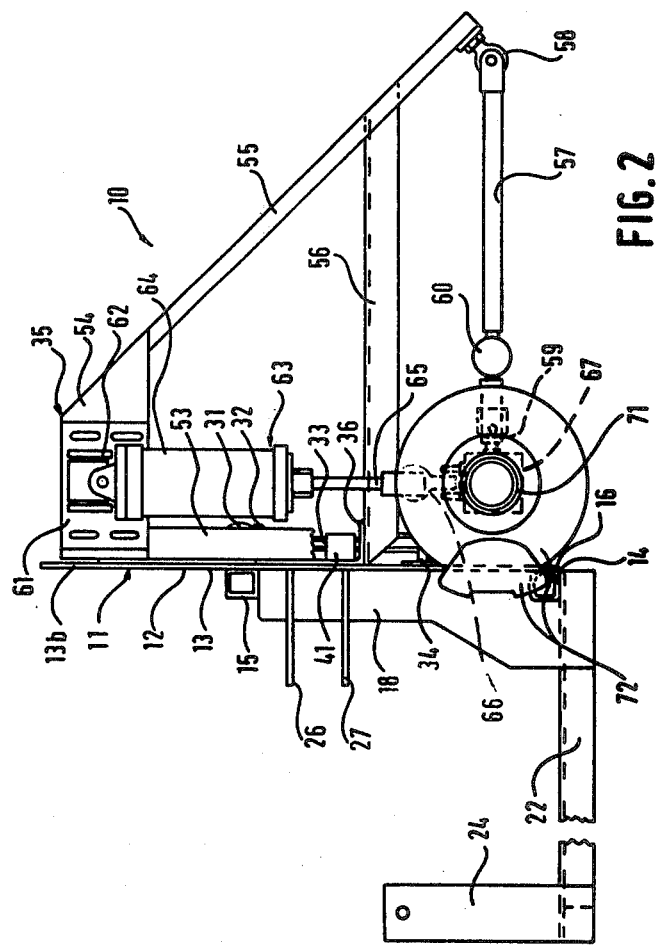

The invention will now be described, by way of example, with reference to the accompanying drawings in which:

Figure 3:
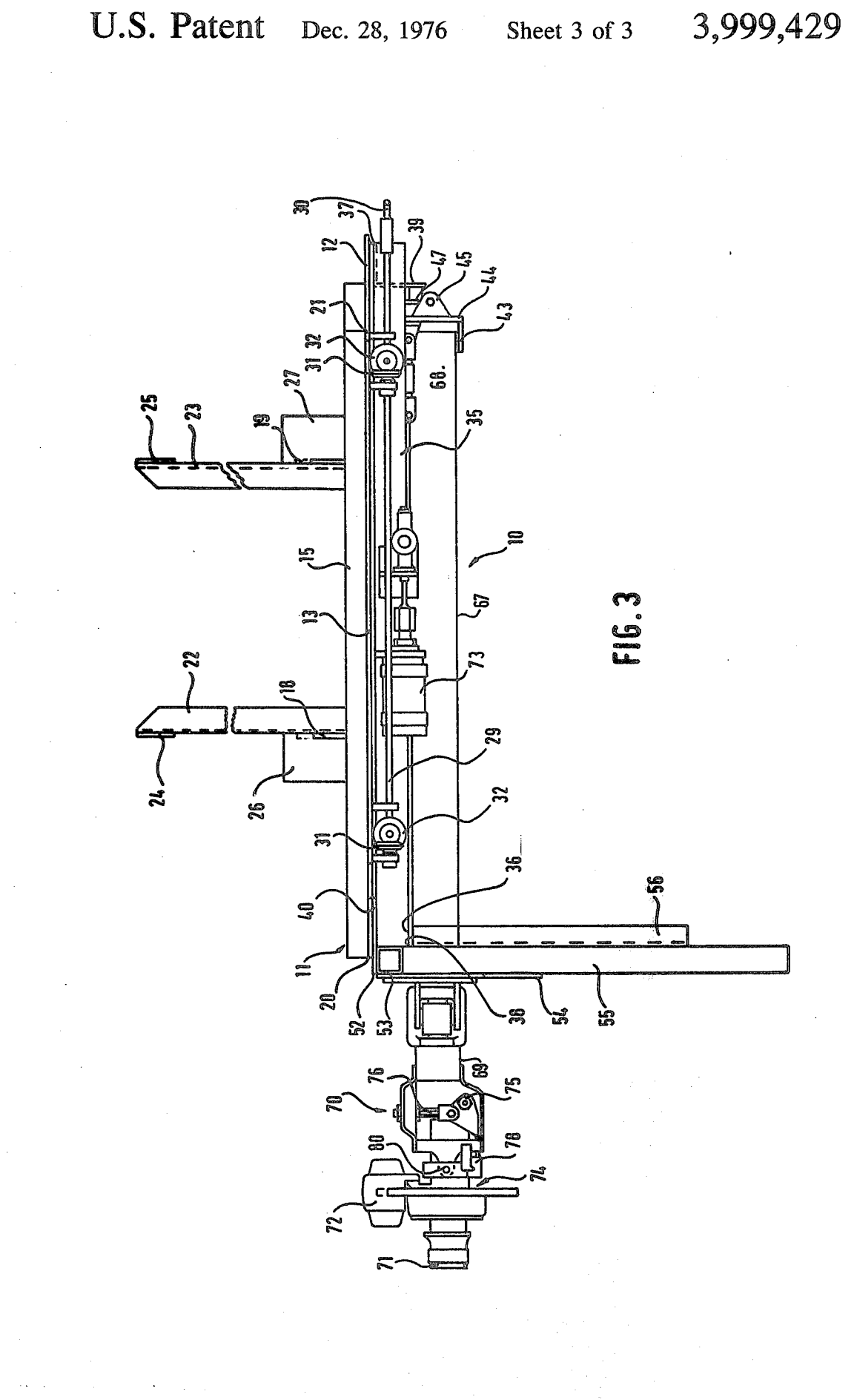

FIGS. 1, 2 and 3 are respectively front elevation, side elevation and plan view of an apparatus in accordance with the invention.

Tire testing apparatus 10 comprises a framework 11, a measuring beam 67; means 70 in the form of a rotatable spindle 71 for mounting a tire and wheel unit (not shown); means for loading the measuring beam 67 in the form of a pneumatically operated piston and cylinder unit 63; and force transducers 49, 60 for measuring the forces produced by a tire under test.

The framework 11 is made of steel, and split into two component parts. The first component 12 comprises a sheet 13 disposed vertically and extending substantially parallel to the transverse axis of a vehicle on which the apparatus is mounted. The sheet 13 is strengthened by means of two square section lengths of tube 14 and 15 which each have a length substantially equal to the length of the sheet 13. The tube 14 is positioned adjacent the lower edge 16 of the sheet 13 and the tube 15 is positioned adjacent the upper edge 17 of the sheet 13.

The sheet 13 is additionally strengthened by the provision of two plate struts 18, 19 extending perpendicularly from the sheet 13 and being substantially equally spaced from the ends 20, 21 of the sheet 13. The struts 18, 19 extend vertically from the base of the upper tube 15 to below the lower tube 14 which passes through the struts 18, 19. Extending perpendicular to the sheet 13 and attached to the lower ends of the struts 18, 19 are angle pieces 22, 23; said angle pieces 22, 23 each having a vertical plate member 24, 25 extending from the end of pieces 22, 23 remote from the sheet 13 for attachment to a vehicle chassis. The upper end of each of the plate struts 18, 19 have two parallel plates 26, 27 and 28 (only three shown) extending perpendicular from both the plate struts 18, 19 and the sheet 13 for attachment, for example, to the bumper position of a vehicle.

The particular arrangement described is particularly useful for attaching the apparatus to a Land Rover vehicle but it will be clearly appreciated that any suitable arrangement of strengthening and attaching struts may be used and also varied to suit the vehicle to which the apparatus is to be attached.

A rotatable rod 29 is supported adjacent the edge 17 of the sheet 13 on the opposite side of the sheet 13 to the strengthening and attaching struts. The rod 29 is rotatable by a detachable handle 30. At each end of the rod 29 is journalled a bevel gear 31 in contact with a second bevel gear 32 journalled to a screw-threaded member 33. The members 33 are rotatably fixed into position by support brackets 34 fixed to the sheet 13.

The second component 35 of the framework 11 comprises an angle piece 36 extending parallel to the sheet 13; an angle piece 39 extending vertically down from the piece 36 from the end 37 thereof; and a plate 40 extending vertically upward from the opposite end 38 of the piece 36.

The angle piece 36 has, attached thereto, two blocks 41, each having a screw-threaded bore extending vertically therethrough which is complementary to the screw-thread of the members 33 which pass through the bores in the blocks 41.

Attached to the angle piece 39 is a pivot mounting system 42 for the mounting of an end 68 of a measuring beam 67. The system 42 comprises an horizontal pivot linkage 43 which allows the beam 6u to move vertically. The linkage 43 is attached to a plate 44 on the opposite side of which is a second linkage 45 connected to a third linkage 46 by a plate 47, the linkage 46 being attached to the angle piece 39. The linkages 45 and 46 permit the measuring beam 67 to move in a horizontal plane as well as along the longitudinal axis of the beam 67.

Located on the upper end of plate 44 is a further pivot linkage 48 connected to a force transducer 49 which is pivotally linked at 50 to a support bracket 51 attached to the angle piece 36. The forces determined by the transducer 49 being the cornering forces generated by a tire under test.

The plate 40 has adjacent its end 52 a square-sectioned tube 53 extending from the upper edge of said plate 40 to below the angle piece 36 for strengthening purposes (shown cut away in FIG. 2). Attached to the tube 53 is a support plate 54 from which extends, at an angle downwards, a further square-sectioned tube 55. The tube 55 is also supported by a horizontally disposed angle piece 56 extending between the tube 55 and the lower side of the angle piece 36 at the end 38 thereof.

Extending back towards the main framework is a strut 57 pivotally linked at 58 to the tube 55 and at 59 to the measuring beam 67. Located between the pivot 59 and the strut 57 is a second force transducer 60 for measuring braking force. The pivots 58,59 permit free movement of the measuring beam 67 in the vertical plane while permitting measurements to be taken in the horizontal plane.

Attached to the support plate 54 is a second plate 61 from which a universal coupling type of double pivot linkage 62 extends and which is attached to the cylinder 64 of a pneumatically operated piston and cylinder unit 63. The piston 65 of the unit 63 is attached to the measuring beam 67 by means of a second universal coupling type of double pivot linkage 66. The double pivot linkages 62, 66 enable the unit 63 to apply a load to the measuring beam 67 while minimizing the effect of the unit 63 on the movement of measuring beam 67 in both the vertical and horizontal planes.

The measuring beam 67 comprises a square-sectioned tube located parallel to the sheet 13 and the angle piece 36. The beam 67 is attached by its end 68 to the system 42. The opposite end 69 is provided with means 70 for mounting a tire and wheel assembly (not shown).

The mounting 70 comprises a freely rotatable spindle 71 provided with a disc brake unit 72. The brake unit 72 is pneumatically or hydraulically operable via a master cylinder 73 shown mounted on the angle piece 36 but which may be mounted in any convenient location and may even be mounted on the beam 67.

The spindle bearing 74 is pivotally adjustable to allow the camber and slip angle of a tire and wheel assembly mounted on the spindle 71 to be varied. The adjustment for camber and slip angles is made respectively by means of screw-threaded member 75 and 76, the angle in question being shown on scales 77 and 78 respectively. The bearing 74 is pivoted at 79 to allow vertical (camber angle) adjustment and at 80 to allow horizontal (slip angle) adjustment.

The leads and pipes necessary to operate the transducers and cylinder units have been omitted for clarity. The leads and pipes are gathered to a central control/-recording unit which may be located on the vehicle.

In operation, the apparatus 10 is initially calibrated by using standard load cells located between the spindle and a solid support and loads applied to the apparatus. This enables readings from the transducers to be equated with the load cell readings.

The apparatus 10 can then be attached to a vehicle by means of the struts 24 to 28. A tire and wheel assembly for testing is then mounted on the spindle 71. The handle 30 is attached to the rod 29 and turned to adjust the height of the framework component 35 whereby the tire contacts the road surface with the measurung beam 67 horizontal. After this adjustment the framework component 35 is locked into position with the component 12 by means of, for example, nuts and bolts (not shown). These can, for example, be positioned between the angle piece 39 and the extension 13a of the sheet 13, and the plate 40 and the extension 13b of the sheet 13, and at any other suitable position. Slots may be provided in the sheet 13 in which the bolts can slide. The unit 63 is used to apply a load to the tire.

The necessary camber and/or slip angle are set by means of the members 75, 76 prior to each test run. The tests may include: braking force measurement with and without camber angle setting in the straight position; braking force measurement with and without camber angle setting and with slip-angle setting (i.e. braking while cornering); cornering force measurement in the straight position or at varying slip and/or camber angles and/or braking applied.

During each test run the transducer 49, 60 readings, vehicle and tire speed readings and the brake line pressure readings are recorded so that the results of each test run can be fully analysed.

Apparatus according to the invention is simple to construct without incurring great expense and furthermore is readily mountable and de-mountable on a standard vehicle at, for example, the bumper position of the vehicle.

In addition the apparatus readily permits a tire under test to be mounted forwards of the vehicle wheels in the normal direction of forward movement of the vehicle and thus when conducting tire performance tests on wet or snow covered surfaces the photographs and other records being taken of, for example, the spray patterns of the tire under test are uninfluenced by spray generated by tires of the vehicle wheels.

Having now described my invention — what I claim is:

1. A tire testing apparatus comprising a framework for attachment to a vehicle, a measuring beam for mounting substantially parallel to the transverse axis of a vehicle to which the apparatus is to be attached during use, said beam being mounted pivotally at one end to the framework so that the beam is capable of pivotal movement in horizontal and vertical planes, means for mounting a tire to be tested on the end of said beam remote from the pivotal mounting, means for applying a load to the beam to place under load a tire being tested, and at least one force transducer for measuring the force applied to the beam by a tire when under test.

2. A tire testing apparatus according to claim 1 wherein part of the framework to which the measuring beam is pivotally mounted comprises a support member adjustable in position relative to the remainder of the framework.

3. A tire testing apparatus according to claim 1 wherein the means for applying a load to the measuring beam comprises a piston and cylinder assembly.

4. A tire testing apparatus according to claim 3 wherein the piston and cylinder assembly is pivotally connected both to the framework and the beam.

5. A tire testing apparatus according to claim 1 having means for applying braking forces to a tire when mounted on the apparatus.

6. A tire testing apparatus according to claim 1 wherein a spindle is rotatably mounted on the beam for rotatably supporting a tire relative to the beam.

7. A tire testing apparatus according to claim 6 wherein the axis of the spindle is adjustable in both vertical and transverse planes relative to the apparatus.

8. A tire testing apparatus according to claim 7 wherein at least one scale and pointer set is provided on the beam and a support bearing for the spindle for measurement of the direction of the axis of the spindle relative to the beam.

9. A tire testing apparatus according to claim 8 wherein a force transducer is located between the beam and framework for measuring compression and tension forces generated by cornering forces on a tire under test.

10. A tire testing apparatus according to claim 1 wherein a force transducer is located between the beam and framework to measure tension forces resulting when braking forces are applied to a tire under test.

11. A vehicle comprising tire testing apparatus according to claim 1 attached to an end of the vehicle.

12. A vehicle according to claim 1 wherein the means for mounting a tire to be tested on the end of the beam is positioned forwards of the vehicle wheels in the direction of normal forward movement of the vehicle.

* * * * *